US012657191B2

(12) United States Patent
Ki et al.

(10) Patent No.: US 12,657,191 B2
(45) Date of Patent: Jun. 16, 2026

(54) SYSTEMS AND METHODS FOR PROCESSING DATABASE QUERIES VIA A COMPUTATIONAL STORAGE DEVICE

(71) Applicant: Samsung Electronics Co., Ltd., Suwon-si (KR)

(72) Inventors: Yang Seok Ki, Palo Alto, CA (US); Changho Choi, San Jose, CA (US); Yangwook Kang, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 17/881,550

(22) Filed: Aug. 4, 2022

(65) Prior Publication Data

US 2023/0359624 A1     Nov. 9, 2023

Related U.S. Application Data

(60) Provisional application No. 63/339,861, filed on May 9, 2022.

(51) Int. Cl.
*G06F 16/2455*     (2019.01)
*G06F 16/2458*     (2019.01)
*G06F 16/27*     (2019.01)

(52) U.S. Cl.
CPC ...... *G06F 16/2455* (2019.01); *G06F 16/2471* (2019.01); *G06F 16/273* (2019.01)

(58) Field of Classification Search
CPC . G06F 16/2455; G06F 16/2471; G06F 16/273
USPC ........................................................ 707/769
See application file for complete search history.

(56) References Cited

U.S. PATENT DOCUMENTS

| | | | |
|---|---|---|---|
| 7,660,793 B2 | 2/2010 | Indeck et al. | |
| 7,895,151 B2 | 2/2011 | Shau et al. | |
| 8,244,718 B2 | 8/2012 | Chamdani et al. | |
| 8,458,129 B2 | 6/2013 | Surlaker et al. | |
| 8,561,037 B2 | 10/2013 | Wallach et al. | |
| 9,063,974 B2 * | 6/2015 | Aingaran ................ H04L 69/14 | |
| 9,075,710 B2 * | 7/2015 | Talagala .............. G06F 12/0246 | |

(Continued)

FOREIGN PATENT DOCUMENTS

| | | |
|---|---|---|
| WO | WO 2017/101478 A1 | 6/2017 |
| WO | WO 2017/101505 A1 | 6/2017 |
| WO | 2020/133391 A1 | 7/2020 |

OTHER PUBLICATIONS

EPO Extended European Search Report dated Oct. 4, 2023, issued in European Patent Application No. 23171286.0 (10 pages).

(Continued)

*Primary Examiner* — Hanh B Thai
(74) *Attorney, Agent, or Firm* — Womble Bond Dickinson (US) LLP

(57)     ABSTRACT

Systems and methods for processing a database query from a device are disclosed. A first command is received in response to the database query. In response to the first command, a storage device is signaled for scanning data in a database object. The signaling of the storage device may include: transmitting a second command for configuring the storage device based on the database query; transmitting a third command for executing a scan of the data in the database object; and transmitting a fourth command for reading an output of the scan, wherein the output is responsive to the database query.

16 Claims, 6 Drawing Sheets

(56) References Cited

U.S. PATENT DOCUMENTS

| | | | | |
|---|---|---|---|---|
| 9,424,315 | B2 | 8/2016 | Chamdani et al. | |
| 9,569,477 | B1 | 2/2017 | McSweeney et al. | |
| 9,936,020 | B2* | 4/2018 | Leggette | H04L 67/1097 |
| 10,394,746 | B2 | 8/2019 | Kachare et al. | |
| 10,528,599 | B1* | 1/2020 | Pandis | G06F 16/2455 |
| 10,565,014 | B2 | 2/2020 | Bolkhovitin et al. | |
| 10,909,114 | B1* | 2/2021 | Virtuoso | G06F 16/2282 |
| 10,922,189 | B2* | 2/2021 | Swallow | G06F 11/302 |
| 10,936,587 | B2* | 3/2021 | Sirohi | G06F 16/24539 |
| 11,061,889 | B2* | 7/2021 | Chong | G06F 3/0608 |
| 11,074,261 | B1* | 7/2021 | Pandis | G06F 16/9535 |
| 11,093,496 | B1* | 8/2021 | Bhatia | G06F 16/24552 |
| 11,144,290 | B2 | 10/2021 | Azimi et al. | |
| 11,586,630 | B2* | 2/2023 | Lee | G06F 16/217 |
| 11,816,103 | B1* | 11/2023 | Goel | G06F 16/24552 |
| 12,050,620 | B2* | 7/2024 | Sonawane | G06F 16/27 |
| 12,135,712 | B2* | 11/2024 | Ramesh | G06F 16/24552 |
| 2003/0200282 | A1* | 10/2003 | Arnold | G06F 16/24552 |
| | | | | 709/219 |
| 2003/0236577 | A1* | 12/2003 | Clinton | G06F 8/51 |
| | | | | 700/9 |
| 2004/0187006 | A1 | 9/2004 | Trapp | |
| 2005/0187977 | A1 | 8/2005 | Frost | |
| 2005/0246443 | A1 | 11/2005 | Yao et al. | |
| 2010/0005067 | A1 | 1/2010 | Howard et al. | |
| 2010/0005077 | A1* | 1/2010 | Krishnamurthy | |
| | | | | G06F 16/24542 |
| | | | | 707/E17.136 |
| 2010/0262633 | A1* | 10/2010 | Bhattacharjee | G06F 16/245 |
| | | | | 711/E12.001 |
| 2011/0099533 | A1* | 4/2011 | Clinton | G05B 23/0213 |
| | | | | 717/108 |
| 2012/0137365 | A1* | 5/2012 | Lee | G06F 21/567 |
| | | | | 726/23 |
| 2013/0110862 | A1* | 5/2013 | Chen | G06F 16/2455 |
| | | | | 707/E17.14 |
| 2013/0159316 | A1* | 6/2013 | Egan | G06F 16/2255 |
| | | | | 707/744 |
| 2013/0173971 | A1* | 7/2013 | Zimmerman | G11C 29/32 |
| | | | | 714/E11.155 |
| 2013/0275656 | A1* | 10/2013 | Talagala | G06F 12/0246 |
| | | | | 711/103 |
| 2014/0095534 | A1* | 4/2014 | Aingaran | G06F 9/546 |
| | | | | 707/769 |
| 2014/0123316 | A1* | 5/2014 | Leggette | H04L 67/1097 |
| | | | | 726/28 |
| 2014/0143266 | A1* | 5/2014 | Bice | G06F 16/24575 |
| | | | | 707/760 |
| 2014/0310232 | A1 | 10/2014 | Plattner et al. | |
| 2015/0046679 | A1 | 2/2015 | Gathala et al. | |
| 2015/0058353 | A1 | 2/2015 | Sorkin et al. | |
| 2015/0154225 | A1* | 6/2015 | Fauser | G06F 16/183 |
| | | | | 707/610 |
| 2015/0363113 | A1* | 12/2015 | Rahman | G06F 9/4881 |
| | | | | 711/170 |
| 2016/0062954 | A1* | 3/2016 | Ruff | G06F 40/205 |
| | | | | 715/249 |
| 2018/0097908 | A1 | 4/2018 | Ayyagari et al. | |
| 2018/0121297 | A1* | 5/2018 | Swallow | G06F 11/1464 |
| 2018/0150514 | A1* | 5/2018 | Willems | G06F 16/24539 |
| 2018/0285418 | A1* | 10/2018 | Petropoulos | G06F 16/3332 |
| 2020/0050694 | A1* | 2/2020 | Avalani | G06F 16/25 |
| 2020/0097210 | A1* | 3/2020 | Chang | G06F 21/6218 |
| 2021/0182064 | A1 | 6/2021 | Kara et al. | |
| 2021/0216459 | A1* | 7/2021 | Benhanokh | G06F 13/1663 |
| 2021/0271680 | A1 | 9/2021 | Lee et al. | |
| 2021/0397567 | A1 | 12/2021 | Kang et al. | |
| 2022/0156150 | A1 | 5/2022 | Peake et al. | |
| 2022/0342601 | A1* | 10/2022 | Daoud | G06F 3/0634 |
| 2023/0161771 | A1* | 5/2023 | Lee | G06F 12/063 |
| | | | | 707/769 |
| 2023/0185804 | A1* | 6/2023 | Jakschitsch | G06F 16/2455 |
| | | | | 707/718 |
| 2024/0160610 | A1* | 5/2024 | An | G06F 16/21 |

OTHER PUBLICATIONS

EPO Extended European Search Report dated Oct. 16, 2023, issued in European Patent Application No. 23171293.6 (10 pages).

Choi, Won Gi et al., "OurRocks: Offloading Disk Scan Directly to GPU in Write-Optimized Database System," IEEE Transactions on Computers, vol. 70, No. 11, 2021, pp. 1831-1844.

Chiu, Steve C., "Processor-Embedded Distributed Storage for High-Performance I/O," Northwestern University, Jun. 2004, 193 pages.

US Office Action dated Mar. 11, 2025, issued in U.S. Appl. No. 17/881,378 (12 pages).

US Final Office action dated Oct. 17, 2024, issued in U.S. Appl. No. 17/881,378 (11 pages).

US Final Office Action dated Oct. 20, 2025, issued in U.S. Appl. No. 17/881,378 (11 pages).

* cited by examiner

SYSTEMS AND METHODS FOR PROCESSING DATABASE QUERIES VIA A COMPUTATIONAL STORAGE DEVICE

CROSS-REFERENCE TO RELATED APPLICATION(S)

This application claims priority to and the benefit of U.S. Provisional Patent Application No. 63/339,861 filed in the United States Patent and Trademark Office on May 9, 2022, the entire disclosure of which is incorporated by reference herein.

FIELD

One or more aspects of embodiments according to the present disclosure relate to processing database queries, and more particularly, to processing database queries using a computational storage device.

BACKGROUND

It may be desirable to use a computational storage device (for example, a solid state drive (SSD) with an embedded processor or Field Programmable Gate Array (FPGA)), for various data processing tasks, as such a storage device may help provide efficient and cost-effective data processing solutions. For example, the computational storage device may be used for performing database (DB) scan operations that may otherwise be executed by a host CPU processor. Accessing the storage device for a DB scan operation may be costly in terms of I/O.

The above information disclosed in this Background section is only for enhancement of understanding of the background of the present disclosure, and therefore, it may contain information that does not form prior art.

SUMMARY

Systems and methods for processing a database query from a device are disclosed. A first command is received in response to the database query. In response to the first command, a storage device is signaled for scanning data in a database object. The signaling of the storage device may include: transmitting a second command for configuring the storage device based on the database query; transmitting a third command for executing a scan of the data in the database object; and transmitting a fourth command for reading an output of the scan, wherein the output is responsive to the database query.

According to some embodiments, the method further comprises providing the output to the client.

According to some embodiments, the configuring of the storage device includes configuring logic of the storage device for performing the scan of the data.

According to some embodiments, the configuring of the logic includes loading a scan program to a processor of the storage device.

According to some embodiments, the configuring of the storage device includes allocating a region of a second memory of the storage device for use for the scan of the data.

According to some embodiments, the method further comprises: identifying a physical address associated with the database object; and transmitting a fifth command to the storage device for retrieving data from the physical address, into the region of the second memory.

According to some embodiments, the database object is a file, wherein the identifying the physical address includes identifying the physical address mapped to the file.

According to some embodiments, the storage device generates an output in response to executing the scan of the data, wherein the output is stored in the region of the second memory.

According to some embodiments, the first command is received from a gateway configured to route the first command based on a status of the storage device.

According to some embodiments, the gateway is configured to select the storage device based on the status.

Embodiments of the present disclosure are also directed to a system for processing a database query from a client. The system includes a processor and a memory. The memory stores instructions that, when executed by the processor, cause the processor to: receive a first command in response to the database query; and in response to the first command, signal a storage device for scanning data in a database object. The signaling of the storage device may include; transmitting a second command for configuring the storage device based on the database query; transmitting a third command for executing a scan of the data in the database object; and transmitting a fourth command for reading an output of the scan, wherein the output is responsive to the database query.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
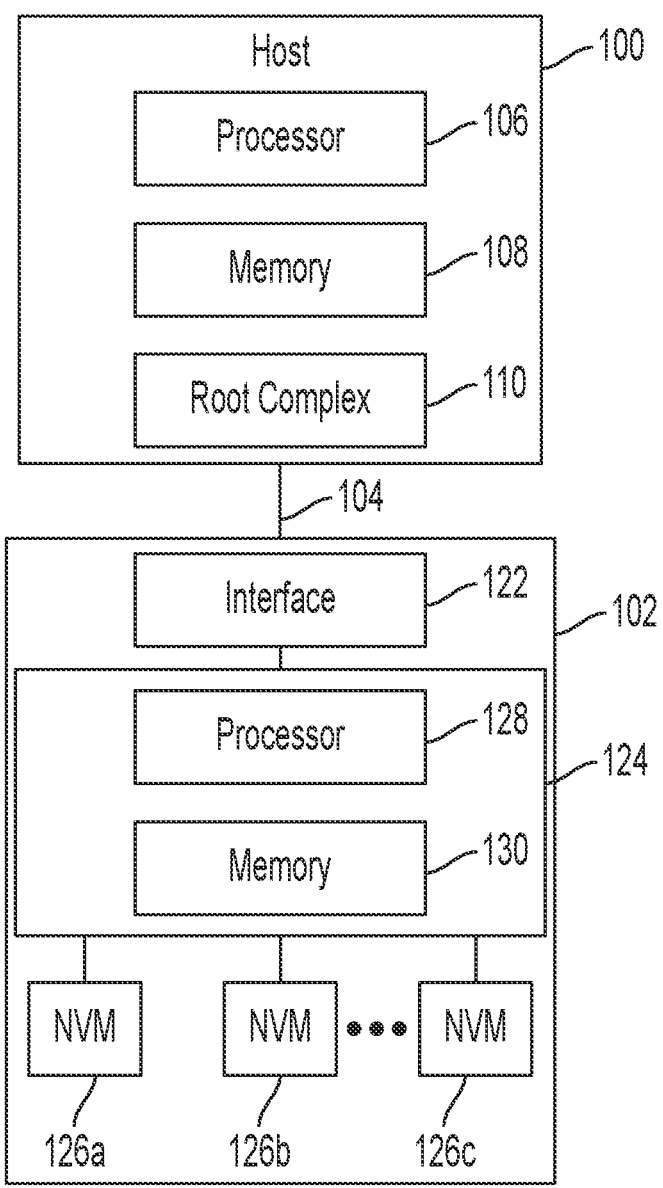
FIG. 1 depicts a block diagram of a system for processing database queries according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Data stored in a database (DB) may be indexed or not. A full scan of the database (also referred to as a full table/DB scan) may be needed to respond to a DB query if the data is not indexed. A full table scan may be slow due to, for example, a heavy amount of input/output (I/O) reads required to scan the database. A full table scan may also use a large amount of memory and computing resources of a host device, as during the full scan, each row in the database may need to be checked to see if one or more columns in the query meet a query criterion In the field of data storage and processing, indexing may often optimize performance of a database when processing DB queries. When contents of a DB are not indexed, a full DB scan may be needed. For example, when performing a search of a DB that contains unindexed data, a host device may need to load the DB onto the host device's memory, and use the host device's computational resources to perform a full scan of the DB in the memory. Thus, it may be desirable to have a system and method for performing a DB scan operation in a way that minimizes use of host resources, while providing better (e.g., faster) scan performance and scalability.

In general terms, embodiments of the present disclosure are directed to systems and methods for offloading DB scan operations to one or more computational storage devices. Offloading the scan operation may help isolate scan overheads to the one or more devices conducting the scan operation, help reduce host resource usage, and increase scan speed.

Embodiments of the present disclosure provide command sets, communication mechanisms, and data structures to support data flows across multiple data processing layers of a host device and one or more computational storage devices. In one embodiment, a microservice gateway and/or scan processing engine help overcome typical challenges in exploiting computational storage devices in a database management system (DBMS). Such challenges may relate to permission (e.g., DBMS do not typically run with root privileges), complexity (e.g., for scheduling of the I/O requests and scan operations), and scalability (e.g., to support local and/or remote storage devices).

In one embodiment, service requests to the storage devices may be routed via a microservice gateway. The microservice gateway may function as an interface layer between client applications and service applications of the storage devices. An exemplary service requested by a client application may be, for example, a custom DB scan request that allows the offloading of the scan operation to the storage devices. Although scan offloading is used as an example of a service request, embodiments of the present disclosure are not limited thereto, and may include other service requests including I/O requests.

In one embodiment, the microservice gateway includes an application programming interface (API) that may be accessed by the client applications to transmit the service requests. For example, a DBMS of the host device may use the API to send a custom DB scan request to the storage devices. The microservice gateway may select an appropriate storage device to handle the service request. The storage device may be selected based on, for example, the status of the storage device.

In one embodiment, the service request transmitted by the microservice gateway is received and processed by a service application of the selected storage device. The service application handling DB scan requests for the selected storage device may be referred to as a scan processing engine (SPE).

In one embodiment the SPE receives the custom DB scan request, and transmits commands, during an initialization phase, to initialize/configure the selected storage device to process scan request. The SPE may further schedule and transmit I/O and scan execution commands to the storage device during an execution phase, and deliver scan outputs to the microservice gateway. The SPE may further be configured to manage the storage device so that a proper number of scan requests may be assigned to the storage device so as to maximize its performance.

In one embodiment, the SPE uses the initialization phase to allocate memory of the storage device, and prefetch data into the memory of the storage device. The prefetching may entail, for example, starting the retrieving process of the data from the storage device, prior to start of the DB scan operation. For example, the SPE may perform an address translation of a logical address of a DB object (e.g., DB file) stored in the storage device, to a physical address. The data stored in the physical address may be prefetched into the internal memory of the storage device.

During an execution stage, the SPE may transmit one or more commands to execute the scan operation based on the data fetched into the internal memory of the storage device. The SPE may further transmit one or more commands to read the results of the scan operation, and forward the results to the requesting client (e.g., via the microservice gateway).

FIG. 1 depicts a block diagram of a system for processing database queries according to one embodiment. The system may include a host device (e.g., host computer) 100 coupled to one or more computational storage devices 102 over a network fabric 104. The network fabric 104 may include, for example, a Peripheral Component Interconnect (PCI), PCI-Express (PCIe) bus, and/or the like. The communication protocol that may be used for communicating over the network fabric 104 may be, for example, Compute Express Link (CXL), Non Volatile Memory Express (NVMe), NVMe over fabrics (NVMe-oF), and/or the like. The computational storage devices 102 may take any suitable form, including but not limited to, the form of solid state drives (SSDs), Ethernet SSDs (eSSDs), and/or the like.

The host device 100 may include a host processor 106 and a host memory 108. The host processor 106 may be a general purpose processor, such as, for example, a central processing unit (CPU) core of the host device 100. The host memory 108 may include, for example, a random access memory (RAM) (e.g., a dynamic random-access memory (DRAM)), read-only memory (ROM), and the like.

The host device 100 may include an interface 110, also referred to as a root complex (RC), for connecting the processor 106 and host memory 108 to the network fabric 104. The interface 112 may include one or more ports that the storage devices 102 may use to connect to the host device 100 via the network fabric 104. In some cases, the one or more ports may connect to a switch, and remotely located storage devices 102 may connect to the host device 100 via the switch.

In one embodiment, the one or more computational storage devices 102 include a storage interface 122, a storage controller 124, and one or more non-volatile memory (NVM) devices 126a-126c (collectively referenced as 126). The storage interface 122 may facilitate communications (e.g., using a connector and a protocol) between the host device 100 and the storage device 102. In some embodiments, the storage interface 122 may facilitate the exchange of storage requests and responses between the host device 100 and the storage device 102. In some embodiments, the storage interface 110 may facilitate data transfers by the storage device 102 to and from the host memory 108 of the host device 100. In one embodiment, the storage interface 122 (e.g., the connector and the protocol thereof) includes a PCIe connection. In one embodiment, the NVMe protocol is used to communicate with the host 100 over the PICe connection. In this regard, the storage interface 122 may further support one or more command sets including an NVMe command set, a custom scan logic command set, and/or the like.

In one embodiment, the storage controller 112 includes a storage processor 128 and a storage memory 130. The storage processor 128 may include at least one embedded processing circuit. The embedded processing circuit may include, for example, a digital circuit (e.g., a microcontroller, a microprocessor, a digital signal processor, a field programmable gate array (FPGA), an application-specific integrated circuit (ASIC), and/or the like) capable of executing data access instructions to provide access to and from the data stored in the NVM device 126. For example, the data access instructions may include any suitable data storage and retrieval algorithm (e.g., read/write) instructions, encryption/decryption algorithm instructions, compression algorithm instructions, and/or the like.

In one embodiment, the digital circuit may include static logic blocks and/or dynamically reconfigurable logic blocks (e.g., dynamic logic blocks). For example, the host device 100 may provide logic for configuring one or more of the logic blocks for performing custom scan operations in response to a DB query. For example, the logic may be an initialization logic for allocating a region of the storage memory 130 for use for the custom scan operation. The initialization may be a one-time initialization, and/or a query-by-query initialization.

In one embodiment, the logic configured in the logic blocks includes a custom scan logic. The custom scan logic may be for executing a hardware-based scan operation of one or more DB objects stored in the NVM device 126. The hardware-based scan may be performed as described in U.S. patent application Ser. No. 17/720,272, filed on Apr. 13, 2022, entitled "Hybrid Database Scan Acceleration System," the content of which is incorporated herein by reference.

In one embodiment, the storage memory 130 is configured for short-term storage or temporary memory during operation of the storage devices 102. The storage memory may include a DRAM, static random access memory (SRAM), and/or Data Tightly Coupled Memory (DTCM). The storage memory 130 may include one or more buffers, such as an input buffer and an output buffer. The input buffer may be used to hold one or more DB table pages retrieved from the NVM device 126. The data in the input buffer may be scanned by the custom scan logic configured in the storage processor 128. The output buffer may be used to hold the results of the custom scan operation.

The NVM devices 126 may include, for example, NAND flash memory. In the context of a database management system, the NVM devices 126 may store one or more database files generated by the host device 100. The database files may be stored in the NVM devices 114 in any suitable database format such as, for example, columnar format or row-based format.

Figure 2:
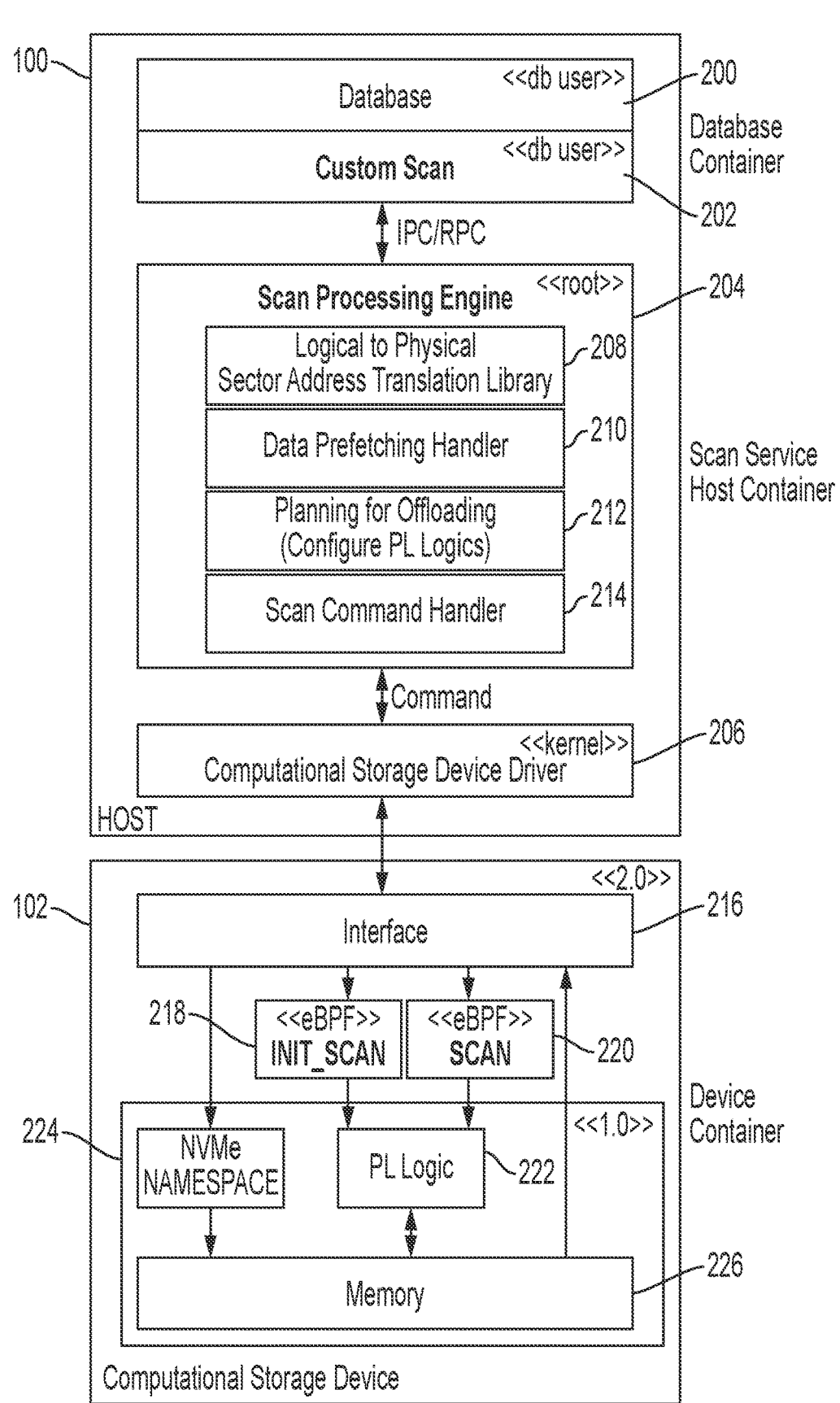
FIG. 2 depicts a block diagram of an architecture of a host device and a storage device according to one embodiment.

FIG. 2 depicts a block diagram of the architecture of the host device 100 and the storage device 102 according to one embodiment. Although a single storage device is shown in the embodiment of FIG. 2, a person of skill in the art should appreciate that the host device may be coupled to a plurality of storage devices 102 for offloading scan operations to the plurality of storage devices.

The various architecture components of the host device 100 may include, for example, a DBMS/database 200, custom scan plugin 202, scan processing engine (SPE) 204, and computation storage device driver 206. The architecture components may be implemented, for example, via computer program instructions that are stored in the host memory 108 and executed by the host processor 106.

The DBMS/database 200 may be for example, a relational database such as, for example, PostgreSQL. The database 200 may be configured to receive DB queries from a client application, and generate executable commands (also referred to as a query plan) for executing the query.

In one embodiment, the custom scan plugin 202 is configured to receive and parse a DB query received by the database 200, and determine whether the DB query is one that may be processed by the SPE 204. For example, if the DB query is directed to unindexed data, the custom scan plugin 202 may determine that the query should be processed by the SPE 204 via a custom DB scan operation. If the DB query is one that cannot or should not be processed by the SPE 204, or if a traditional DB scan is to be conducted by the host processor 106, the customer scan plugin 202 may instruct the database 100 to process the query according to the generated query plan.

In one embodiment, the custom scan plugin 202 takes the function of middleware between the database 200 and the SPE 204. In this regard, if the custom scan plugin 202 determines that the DB query is to be processed by the SPE 204, the custom scan plugin may transmit a service request to the SPE 204 to process the DB query via a custom DB scan. The custom scan plugin 202 may further receive results of the custom DB scan operation, and output the results to the client application as a response to the DB query. The communication between the custom scan plugin 202 and the SPE 204 may be via inter-process communication (IPC) and/or remote procedure call (RPC).

The SPE 204 may be configured to receive the custom DB scan request from the customer scan plugin 202, and determine how to process the query. For example, the SPE may determine how many concurrent scans to issue to the storage device(s) 102, pick and/or combine scan ranges, and/or the like. The number of concurrent scans may depend, for example, on the availability of the storage devices 102 to do the scan computations.

The SPE 204 may take other preprocessing actions for a custom DB scan request. For example, the SPE 204 may identify and prefetch data from the NVM device 126, into the storage memory 130 (e.g., using a write command). In this regard, an address translation library 208 may be invoked to perform an address translation of a logical address of a DB file of a file system, into a logic block address (LBA) of the storage device 102.

A data prefetching handler 210 may then be invoked for prefetching the DB file from the NVM device 126, into the storage memory 130. For example, the prefetching may start prior to the execution of the scan operation, and continue in the background as the scan operation is executed by the storage device 102.

The SPE 204 may further generate and transmit commands for configuring the storage processor 128 with one or more programs (e.g., computational logic command sets or programmable logic) needed for the scan operation. The one or more programs may be an initialization program 218 for receiving and executing initialization commands from the SPE 204. The initialization commands may be for allocating a region of the storage memory 130 to store data during execution of the scan. The allocated region may be used, for example, for an input buffer to store DB files retrieved from the NVM device 126. The initialization commands may also be for determining memory locations of one or more output buffers for storing outputs of the scan operations.

The one or more programs loaded to the storage processor 128 may also be a scan program 220 for performing a scan operation on the data in the input buffer. In this regard, the SPE 100 may include a scan command handler 214 that transmits commands to the scan program 220 to perform the hardware scan operation, to execute, or schedule the execution of, a hardware scan operation. In one embodiment, the scan commands are asynchronous scan commands that are batched and sent to the storage device 102 for processing.

In one embodiment, the host device 100 includes a computational storage device driver 206 that enables communication between the host device and the storage device 102. For example, the commands generated by the SPE 204 may be delivered to the storage device 102 via the device driver 206.

The storage device 102 may include a storage interface 216 that may similar to the storage interface 122 of FIG. 1. The storage interface 216 be configured to interface with the computational storage device driver 206 of the host 100, to exchange commands, programs, and data to and from the storage device 102. For example, the interface 216 may be used to load the computational logic command sets (e.g., initialization program 218 and the scan program 220) into a programmable logic 222 of the storage processor 128.

Figure 3:
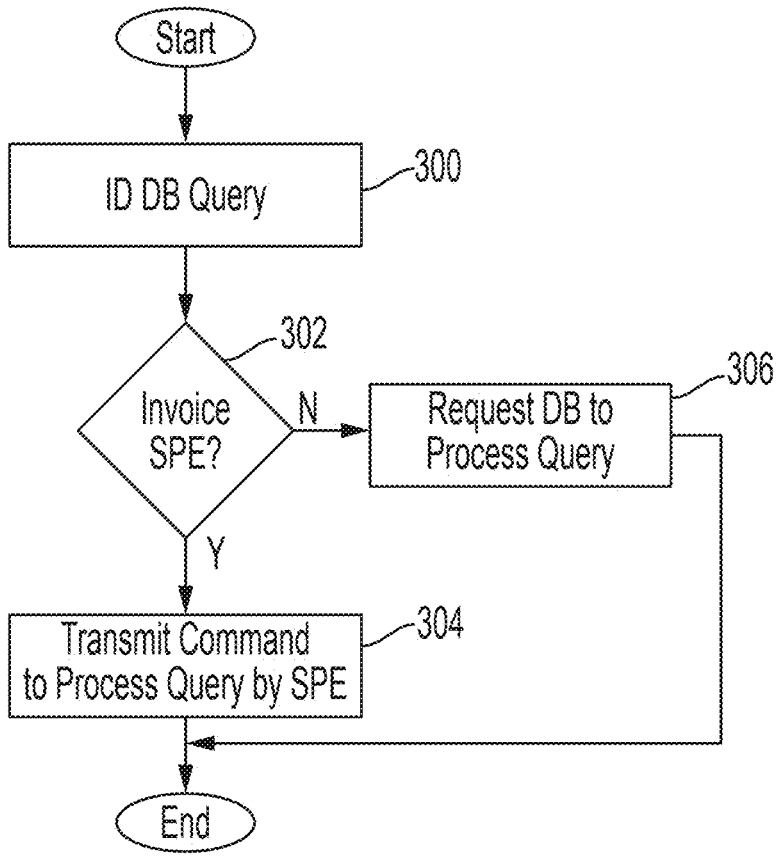
FIG. 3 depicts a flow diagram of a process for processing a DB query according to one embodiment.

FIG. 3 depicts a flow diagram of a process for processing a DB query according to one embodiment. The process starts, and in act 300, the custom scan plugin 202 identifies the DB query provided to the database 200 by a client application.

In act 302, the custom scan plugin determines whether the SPE 204 should be invoked for processing the DB query. For example, if the query is directed to unindexed data, the answer may be YES, and the custom scan plugin 202 may transmit a command, in act 304, to invoke the SPE 204 to process the DB query.

If the answer is NO, the custom scan plugin 202 may request the database 200, in act 306, to process the DB query according to its query plan.

Figure 4:
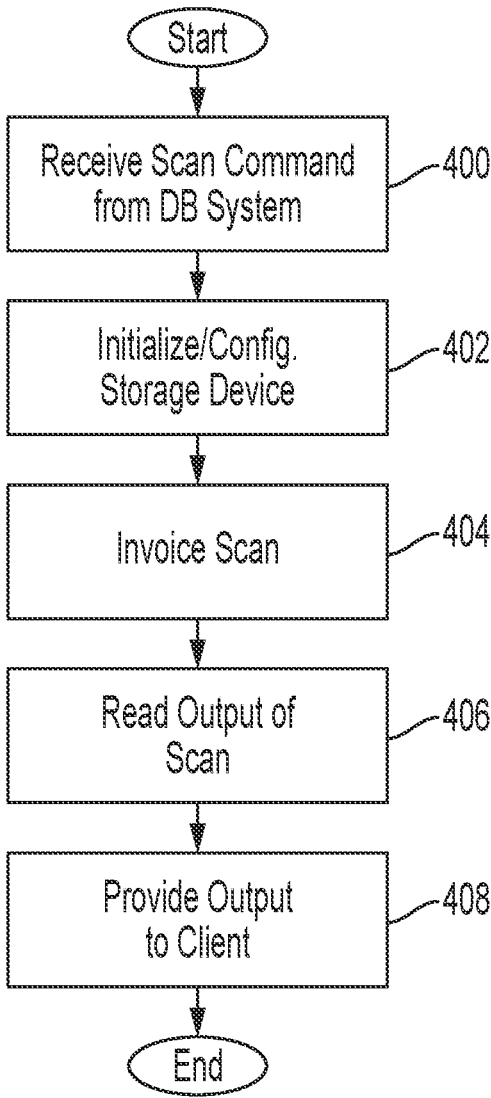
FIG. 4 depicts a flow diagram of a process for offloading a DB scan to a storage device according to one embodiment.

FIG. 4 depicts a flow diagram of a process for offloading a DB scan to the storage device 102 according to one embodiment. The process starts, and in act 400, the SPE 204 receives a command (e.g., scan command) from the custom scan plugin 202 in response to a DB query.

In response to the command, the SPE 204 may invoke the storage device 102 for scanning data in a database object (e.g., DB table) based on the received query. In this regard, the SPE 204 may, in act 402, transmit one or more commands for configuring the storage device 102 for conducting a hardware DB scan. The command may be a one-time initialization command, or a per-query initialization command. The one-time initialization command may be for allocating a region of the storage memory 226 for reading and writing data during the scan operation. Another one-time initialization command may be for loading the initialization and scan programs 218, 220 to the programmable logic 222 of the of storage processor 128.

The per-query initialization command may be for executing the initialization program 218 in preparation of performing a custom DB scan. For example, the initialization program 218 may prepare an input buffer for storing the DB page data, and determine an address of one or more output buffers for storing the outputs of the scan operation. In one embodiment, a separate output buffer may be allocated for each column of a DB table.

The per-query initialization may further include analyzing the DB query for determining a number of concurrent scans that may be issued, determining scan ranges, and/or the like.

The per-query initialization may further include prefetching DB table data to the input buffer of the storage memory 226. In this regard, the SPE 204 may translate a logical address of the DB table stored in a filesystem, to an LBA of the storage device 102. The SPE 204 may transmit a write command based on the translated address. The write command may cause prefetching of data in the NVM device 126, to the input buffer of the storage memory 226.

In act 404, the SPE 204 may transmit one or more commands for executing a custom DB scan of the data in the database object. The SPE 204 may run one or more (e.g., eight) custom scan operations concurrently. The output of the custom DB scan may be stored in the output buffer of the storage memory 226.

In act 406, the SPE 204 may read the results from the output buffer. In this regard, the SPE 204 may invoke a monitoring thread for monitoring signals from the storage device 102 indicative that there is data in the output buffer for being retrieved by the SPE 204. In response to the signal, the SPE 204 may transmit a read command for reading the data from the output buffer, into the host memory 108.

In act 408, the output may be provided to the querying client as a response to the DB query. In one embodiment, the host memory 108 that stores the scan results is shared with the custom scan plugin 202. In this case, the custom scan plugin 202 may access the host memory 108 to retrieve and deliver the results to the querying client.

Microservice Gateway

In one embodiment, the offloading of operations to the storage device 102 may be managed by a microservice gateway. One exemplary operation that may be offloaded to the storage device is a custom DB scan request as described with reference to FIGS. 1-4, although embodiments are not limited thereto. For example, other types of service requests may include other computation requests, authentication requests, input/output (I/O) requests, and/or the like.

In one embodiment, the microservice gateway functions as an interface layer between an application transmitting a service request, and a service application of a storage device processing the request. For example, the microservice gateway may be the interface layer between the custom scan plugin 202 and the SPE 204.

The offloading of service requests to the storage device 102 may entail more than forwarding a received request. For example, evaluation and processing of the request and/or status of the storage device may be needed to select an appropriate storage device to which the service request is to be forwarded. In addition to routing, other types of processing may include authentication of the client application and/or logging of service requests. At least some of the processing may be performed as background processes that may be transparent to the requesting client application. In this manner, the microservice gateway may provide a simple, easy-to-use interface for applications to transmit service requests to the storage device.

Figure 5:
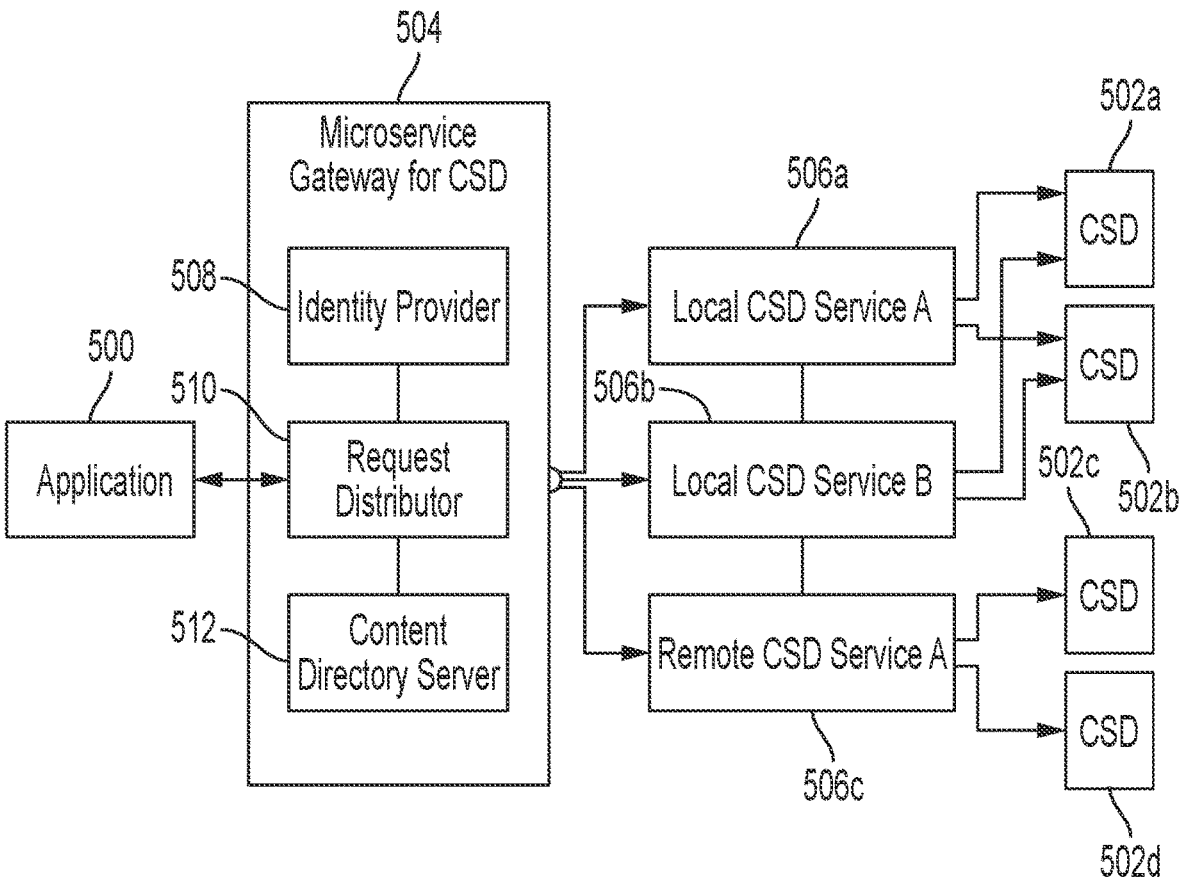
FIG. 5 depicts a block diagram of a system for processing and distributing service requests/queries to one or more computational storage devices according to one embodiment.

FIG. 5 depicts a block diagram of a system for processing and distributing service requests/queries to one or more computational storage devices according to one embodiment. The system includes a client application 500 generating a service request to one or more computational storage devices (CSD) 502a-502d (collectively referenced as 502. The storage devices 502 may similar to the storage devices 102 of FIGS. 1-2.

The client application 500 may include, for example, the database 100 with the custom scan plugin 202 of FIG. 2, and/or other applications that may need to transmit requests to the storage devices. The service request may be a computation request (e.g., a custom DB scan request), a I/O request (e.g., read/write request), and/or the like.

The system includes a microservice gateway 504 that may be implemented, for example, using an application programming interface (API). In this regard, the gateway 504 may function as an interface between the client application 500 and one or more storages services 506a-506c (collectively referenced as 506) handling service requests for the one or more storage devices 502. In some embodiments, the gateway 504 is a stand-alone interface component running on a host device. In some embodiments, the gateway 504 is integrated into one or more of the storage services 506 (e.g., a local storage services 506a, 506b).

The storage services 506 may receive local or remote service requests from the gateway 504. The local requests may include, for example, function calls, IPCs, local transmission control protocol/Internet protocol (TPC/IP) requests, and/or the like. The remote requests may include, for example, RPCs, remote TICP/IP requests, hypertext transfer protocol (HTTP) requests, and/or other requests transmitted over a data communications network.

In one embodiment, at least one storage service 506 is configured to manage service requests for at least one storage device 502. For example, the storage service 506 may engage in address translations (e.g., between a filesystem and the storage device) to find physical addresses of data to the loaded into the storage device's memory. The storage service 506 may further send computation requests to the storage device 502, and read computation outputs from the storage device for delivering it to the gateway 504. One exemplary storage service 506 is the SPE 204 described with respect to FIGS. 1-4.

In one embodiment, the gateway 504 includes one or more components including an identity provider 508, request distributor 510, and content directory server 512. The components may be implemented via software, firmware, and/or hardware. In some embodiments, the gateway 504 is part of the host device 100, and the components may be implemented by the host processor 106 based on instructions stored in the host memory 108

The identity provider 508 may be configured to authenticate the client application 500 as needed. One or more different types of connections and authentication mechanisms may be used for the authentication. The different types of connection may include, for example, TCP/IP, IPC, RPC, and/or local function calls. The different types of authentication mechanisms may include, for example, public key infrastructure-based authentication (e.g., secure sockets layer (SSL) certificates), passwords, hard/soft tokens, device identification, and/or the like. For example, if an SSL client certificate is used for the authentication, the client application 500 engages in an SSL handshake with the identity provider 508, during which the application provides an SSL certificate to the identity provider for verification.

In one embodiment, the request distributor 510 is configured to process and distribute service requests to the storage services 506. The request distributor 510 may be configured to select a location of the data needed to service the request from the client application 500. The data may be stored in one or more of the storage devices 502. The service request may be forwarded to the storage service 506 associated with the selected location. In one embodiment, the location information and/or responses to the service requests may be respectively saved in a location cache and/or response cache. In this manner, the location and/or responses needed to respond to the service requests may be quickly retrieved from the appropriate cache(s) for faster processing of the requests.

In one embodiment, the location and/or availability of resources at a location to service a service request may be provided by the content directory server 512. In this regard, the content directory server 512 may maintain and/or access the location of data needed to service the service request. The location information may include a server address and/or device path of the storage device 502 storing the data. The content directory server 512 may update the location data when data is newly written or updated in the storage device 502.

In one embodiment, the content directory server maintains status information of the one or more locations (e.g., the status of the one or more storage devices in the one or more locations). The status information may include, for example, availability of computing resources of the one or more storage devices 502. The directory server 512 may update the availability information for a location (e.g., from available to not available) when the location is selected or invoked for processing the data stored in the location.

The content directory server 512 may manage the location and status data using, for example, a file system or a database system. For example, a record may be generated in the database system, and the record may identify a location of the storage devices and associated status (e.g., as key-value pairs). For example, the record may store information such as {key, server name, device name, current usage}, where "key" identifies the data, "server name" is the name of the server hosting the storage device 502, "device name" identifies the storage device, and "current usage" identifies the device as available/unused or unavailable/used.

In some embodiments, the location and/or status data is provided by a local storage system, distributed storage system, key-value store, and the like. For example, a key-value store may store a key-value location information as: {"LOC_"+Key, server name, device name}, and key-value status information as {"USAGE_"+Key, current usage}.

Figure 6:
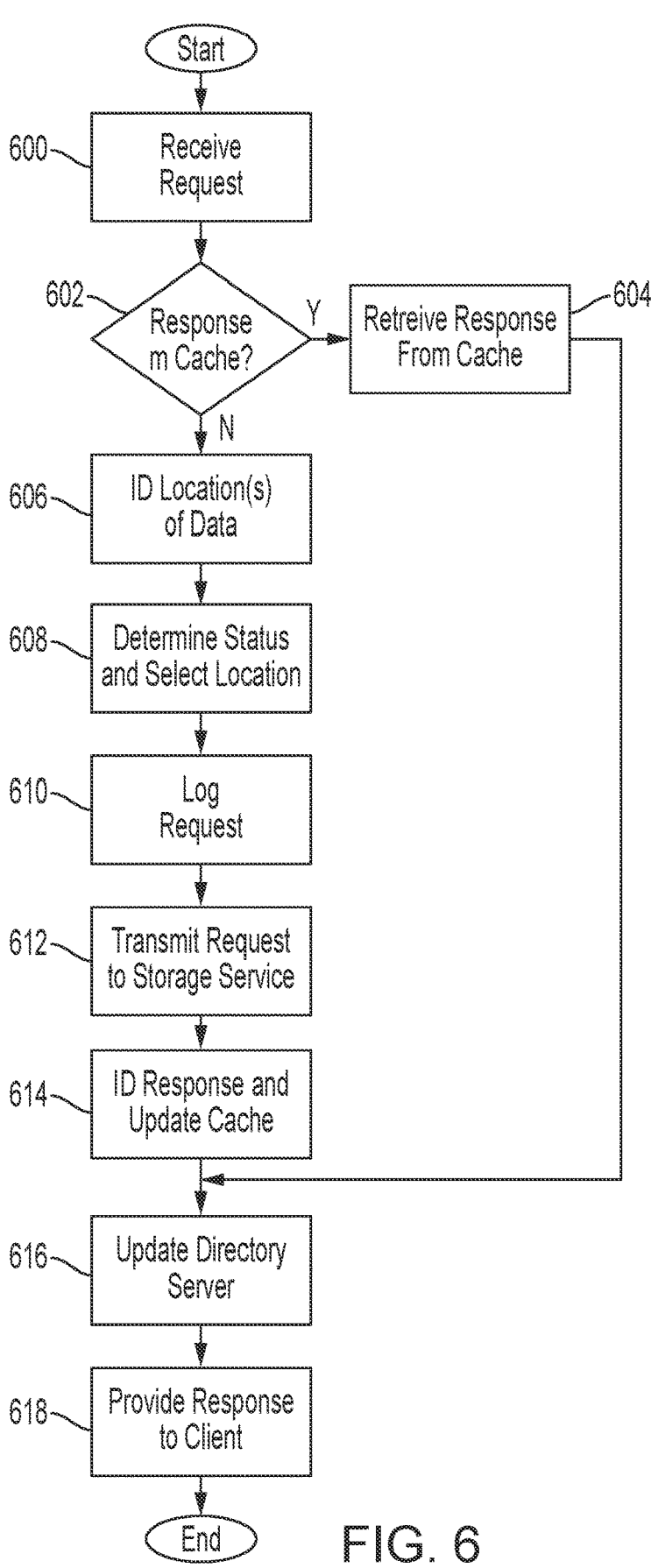
FIG. 6 depicts a flow diagram of a process for processing and distributing service requests to one or more computational storage devices according to one embodiment.

FIG. 6 depicts a flow diagram of a process for processing and distributing service requests to one or more computational storage devices according to one embodiment. The process starts, and in act 600, the gateway 504 receives a service request from the client application 500. The service request may be a computation request for offloading a computation to the storage device 502 such as, for example, a custom DB scan request provided by the custom scan plugin 202. The service request may also be an I/O request such as, for example, a read request for reading data from the storage device, or a write request for storing data into the storage device 502.

In one embodiment, the service request includes one or more of a key, operation type, client information, or metadata. The key may include an identifier of the data to be processed for the service request. The operation type may identify a type of operation requested, such as, for example, a compute, store, read, delete, and/or the like. The client information may identify the client application 500 including, for example, a client name, client Internet Protocol (IP) address, and/or the like. The metadata information may include metadata related to the data such as, for example, length, offset, and/or the like.

In some embodiments, authentication of the client application 500 may be performed (e.g., by the identify provider 508) for verifying the identity of the requesting application. In this regard, the identify provider 508 may determine whether SSL certificates, passwords, tokens, and/or other authentication information received from the client application are valid.

Assuming that the client application 500 may be authenticated, the request distributor 510 determines, in act 602, whether a response to the service request is available in a response cache. If the answer is YES, the response is retrieved from the cache, in act 604, and provided to the requesting client application 500.

If the response is not contained in the response cache, the request distributor 510 identifies, in act 606, one or more locations of the data identified in the service request. For example, the request distributor 510 may send a portion of the service request (e.g., key and operation type) to the content directory server 512 for locating the data. The content directory server 512 may respond with the server addresses and device paths of the locations/storage devices 502 that store the identified data. The content delivery server 512 may further provide status/availability of the identified location/storage device to service the request.

In act 608, the request distributor 510 determines the status of the locations identified by content directory server 512, and selects an appropriate location based on the status information. For example, if the data is stored in multiple locations, the request distributor 510 may select a location based on whether the associated computing resource is busy or idle. The location with an idle computing resource may be selected over a location with a busy computing resource. If more than one location has an idle computing resource, the request distributor 510 may select a local location over a remote one.

In one embodiment, the content directory server 512 is notified of the selection of the location. The content directory server 512 may update the status of the selected location as unavailable.

In act 610, the request distributor 510 may optionally log the service request into a log file. The log of the service request may be for maintaining a record of the service request for debugging purposes, performance monitoring, security, and/or the like.

In act 612, the request distributor 510 transmits the service request to the storage service 506 managing the selected storage device 502. For example, if the service request is a custom DB scan request, the storage service 506 receiving the request may be one of the SPEs 204. The storage service 506 may, for example, find the data to process in the selected storage device 502, and prefetch data into the storage device's internal memory. The storage service 506 may also insert, delete, and update data in the storage devices using, for example, an external storage management system such as a file system or a distributed storage system. The storage service 506 may further send computation requests to the selected storage device, and read computation outputs from the storage device for delivery to the gateway 504.

In act 614, the request distributor 510 may identify a response output by the storage service 506, and update a response cache (if one is used) with the identified response. For example, the response may be stored in the response cache in association with an identifier of the service request.

In act 616, the request distributor 510 may signal the content directory server 512 to update the location of the data if the request changes the location or availability of the data. The content directory server 512 may proceed to update the availability of the storage device 502 based on the updated location.

In act 618, the request distributor 510 provides the response to the client application 500.

It should be understood that the sequence of steps of the processes in the flow diagrams of FIGS. 3, 4, and 6 are not fixed, but can be modified, changed in order, performed differently, performed sequentially, concurrently, or simultaneously, or altered into any desired sequence, as recognized by a person of skill in the art.

In some embodiments, the term processor may refer to one or more processors and/or one or more processing cores. The one or more processors may be hosted in a single device or distributed over multiple devices (e.g., over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g., memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of systems and methods for processing database queries, and systems and methods for processing and distributing service requests, have been specifically described and illustrated herein, many modifications and variations will be apparent to those skilled in the art. Accordingly, it is to be understood that systems and methods for processing database queries, and systems and methods for processing and distributing service requests, constructed according to principles of this disclosure may be embodied other than as specifically described herein. The disclosure is also defined in the following claims, and equivalents thereof.

What is claimed is:

1. A method for processing a database query from a device, the method comprising:

loading one or more programs to a first processor of a computational storage device;

receiving, by a database management system (DBMS) of a computing device having a second processor, a first database query associated with a first database object;

identifying, by the DBMS, a first type of data associated with the first database object; and in response to identifying the first type of data:

identifying an address of the computational storage device storing the first database object;

based on identifying the address of the computational storage device storing the first database object:

transmitting by a device driver of the computing device a first command to the one or more programs for configuring the computational storage device based on the first database query;

transmitting by the device driver a second command to the one or more programs, wherein the first processor of the computational storage device executes the one or more programs and scans a first data in the first database object based on the second command and generates an output of the scan; and transmitting by the device driver a third command for reading the output of the scan, wherein the output is responsive to the database query.

2. The method of claim 1 further comprising:

providing the output to a client.

3. The method of claim 1, wherein the configuring of the computational storage device includes allocating a region of a second memory of the computational storage device for use for the scan of the data.

4. The method of claim 3 further comprising:

identifying a physical address associated with the first database object; and transmitting a fourth command to the computational storage device for retrieving data from the physical address, into the region of the second memory.

5. The method of claim 4, wherein the first database object is a file, wherein the identifying the physical address includes identifying the physical address mapped to the file.

6. The method of claim 3, wherein the output is stored in the region of the second memory.

7. The method of claim 1 further comprising receiving a request from a gateway to process the first database query by the computational storage device, wherein the request is based on a status of the computational storage device.

8. The method of claim 7, wherein the gateway is configured to select the computational storage device based on the status.

9. A system for processing a database query from a client, the system comprising:

a first computational storage device having a first processing circuit;

a second computational storage device having a second processing circuit;

a processor; and a memory, wherein the memory stores instructions that, when executed by the processor, cause the processor to:

load one or more programs onto the first processing circuit of the first computational storage device;

provide to a database managing system (DBMS) a first database query associated with a first database object;

identify, via the DBMS, a first type of data associated with the first database object; and in response to identifying the first type of data:

identify an address of a selected computational storage device from the first computational storage device and the second computational storage device storing the first database object;

based on identifying the selected computational storage device storing the first database object:

transmit by a device driver a first command to the one or more programs for configuring the selected computational storage device based on the database query;

transmit by the device driver a second command to the one or more programs, wherein a corresponding processing circuit of the selected computational storage device is designed to execute the one or more programs and scan a first data in the first database object based on the second command and generate an output of the scan; and transmit by the device driver a third command for reading the output of the scan, wherein the output is responsive to the database query.

10. The system of claim 9, wherein the instructions further cause the processor to:

provide the output to the client.

11. The system of claim 9, wherein the configuring of the selected computational storage device includes allocating a region of a second memory of the selected computational storage device for use for the scan of the data.

12. The system of claim 11, wherein the output is stored in the region of the second memory.

13. The system of claim 9, wherein the instructions further cause the processor to:

identify a physical address associated with the first database object; and transmit a fourth command to the selected computational storage device for retrieving data from the physical address, into a region of a second memory.

14. The system of claim 13, wherein the first database object is a file, wherein the identifying the physical address includes identifying the physical address mapped to the file.

15. The system of claim 9 further comprising a gateway configured to generate a request to process the first database query by the selected computational storage device, wherein the request is based on a status of the selected computational storage device.

16. The system of claim 15, wherein the gateway is configured to select the selected computational storage device based on the status.

* * * * *